(12) United States Patent
Lee (10) Patent No.: US 11,768,625 B2
(45) Date of Patent: Sep. 26, 2023

(54) STORAGE DEVICE MANAGING A MULTI-TIER CACHE MEMORY AND OPERATING METHOD THEREOF

(71) Applicant: SK hynix Inc., Gyeonggi-do (KR)

(72) Inventor: Kyung Soo Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/558,223

(22) Filed: Dec. 21, 2021

(65) Prior Publication Data

US 2022/0405009 A1 Dec. 22, 2022

(30) Foreign Application Priority Data

Jun. 21, 2021 (KR) ........................ 10-2021-0080281

(51) Int. Cl.
- *G06F 3/00* (2006.01)
- *G06F 12/00* (2006.01)
- *G06F 3/06* (2006.01)
- *G06F 12/0802* (2016.01)

(52) U.S. Cl.
CPC .......... *G06F 3/0655* (2013.01); *G06F 3/0604* (2013.01); *G06F 3/0647* (2013.01); *G06F 3/0679* (2013.01); *G06F 12/0802* (2013.01); *G06F 2212/60* (2013.01)

(58) Field of Classification Search
CPC ............. G06F 12/0897; G06F 12/0811; G06F 12/0815; G06F 3/0647; G06F 3/0646; G06F 12/0802; G06F 3/0655
See application file for complete search history.

(56) References Cited

U.S. PATENT DOCUMENTS

| | | | |
|---|---|---|---|
| 5,983,325 A * | 11/1999 | Lewchuk | G06F 12/0802 711/146 |
| 10,417,215 B2 | 9/2019 | Zhang et al. | |
| 2013/0346672 A1* | 12/2013 | Sengupta | G06F 12/0871 711/E12.024 |
| 2014/0115261 A1* | 4/2014 | Maybee | G06F 12/0897 711/E12.071 |
| 2018/0232173 A1* | 8/2018 | Chung | G06F 3/0653 |
| 2018/0336143 A1* | 11/2018 | Lai | G06F 12/0808 |

FOREIGN PATENT DOCUMENTS

| | | | |
|---|---|---|---|
| KR | 10-1498673 B1 | 3/2015 | |
| KR | 10-2016-0075166 A | 6/2016 | |

* cited by examiner

*Primary Examiner* — Reginald G Bragdon
*Assistant Examiner* — Michael L Westbrook
(74) *Attorney, Agent, or Firm* — IP & T GROUP LLP (57) ABSTRACT

A storage device may include: a memory device; a cache memory device including a first cache memory which caches first data among data stored in the plurality of pages and a second cache memory which caches second data among the data stored in the plurality of pages; and a memory controller for counting a number of times that each of the plurality of pages is read and a number of times that each of the plurality of pages is written, based on a read request or a write request which are received from a host, and, moving the first data from the first cache memory to the second cache memory when the first data is stored in a first page and a number of times that the first page is read and a number of times that the first page is written satisfy a predetermined condition.

15 Claims, 10 Drawing Sheets

STORAGE DEVICE MANAGING A MULTI-TIER CACHE MEMORY AND OPERATING METHOD THEREOF

CROSS-REFERENCE TO RELATED APPLICATION

The present application claims priority under 35 U.S.C. § 119(a) to Korean patent application number 10-2021-0080281, filed on Jun. 21, 2021, and which is incorporated herein by reference in its entirety.

BACKGROUND

Field of Invention

The present disclosure generally relates to an electronic device, and more particularly, to a storage device and an operating method thereof.

Description of Related Art

A storage device is a device which stores data under the control of a host device such as a computer or a smart phone. The storage device may include a memory device for storing data and a memory controller for controlling the memory device. The memory device is classified into a volatile memory device and a nonvolatile memory device.

The volatile memory device is a memory device in which data is stored only when power is supplied, and stored data disappears when the supply of power is interrupted. The volatile memory device may include a Static Random Access Memory (SRAM), a Dynamic Random Access Memory (DRAM), and the like.

The nonvolatile memory device is a memory device in which data does not disappear even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

SUMMARY

Embodiments of the present disclosure provide a storage device for managing an improved multi-tier cache memory and an operating method of the storage device.

In accordance with an aspect of the present disclosure, there is provided a storage device including: a memory device including a plurality of pages; a cache memory device including a first cache memory which caches first data among data stored in the plurality of pages and a second cache memory which caches second data among the data stored in the plurality of pages; and a memory controller configured to count a number of times that each of the plurality of pages is read and a number of times that each of the plurality of pages is written, based on a read request or a write request, which are received from a host, and, move the first data from the first cache memory to the second cache memory when the first data is stored in a first page among the plurality of pages and a number of times that the first page is read and a number of times that the first page is written satisfy a predetermined condition.

In accordance with another aspect of the present disclosure, there is provided a method for operating a storage device including a first cache memory and a second cache memory, the method including: storing, in the first cache memory, first data among data stored in a plurality of pages included in a memory device, and storing, in the second cache memory, second data among the data stored in the plurality of pages included in the memory device; counting a number of times that a page corresponding to a read request or a write request is read or a number of times that the page is written, when the read request or the write request is received from a host; and moving the first data from the first cache memory to the second cache memory when the first data is stored in a first page among the plurality of pages and a number of times that the first page is read and a number of times that the first page is written satisfy a predetermined condition.

In accordance with another aspect of the present disclosure, there is provided an operating method of a controller, the method including: caching, into a first cache, page data stored or to be stored in pages within a memory device in response to a first request for accessing the page data, moving at least a part of the cached data into a second cache when a number of accesses to the part becomes greater than a sum of a predetermined number of read accesses to the part and a write access to the part and providing the cached data from one of the first and second caches in response to a second request for accessing the page data.

BRIEF DESCRIPTION OF THE DRAWINGS

Various embodiments of the present disclosure will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and should not be construed as limited to the embodiments set forth herein.

Figure 1:
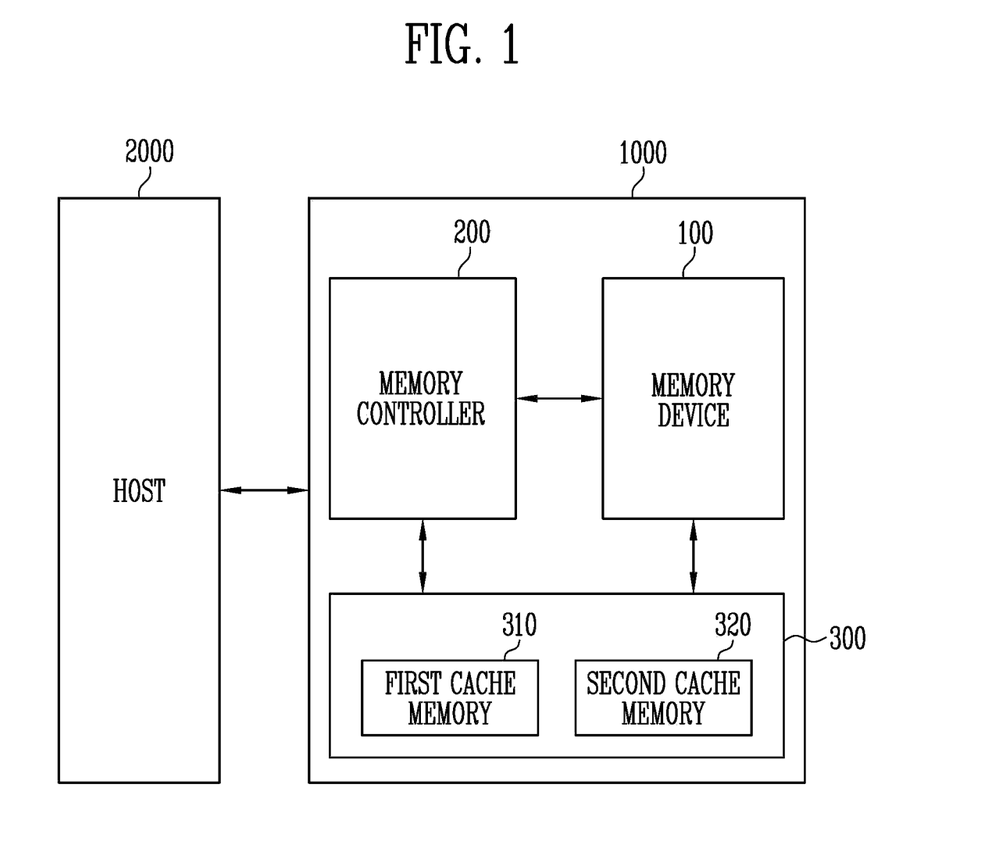
FIG. 1 is a block diagram illustrating a storage device in accordance with an embodiment of the present disclosure.

FIG. 1 is a block diagram illustrating a storage device in accordance with an embodiment of the present disclosure.

Referring to FIG. 1, the storage device 1000 may include a memory device 100, a memory controller 200, and a cache memory device 300.

The storage device 1000 may be a device for storing data under the control of a host 2000, such as a mobile phone, a smart phone, an MP3 player, a laptop computer, a desktop computer, a game console, a display device, a tablet PC or an in-vehicle infotainment.

The storage device 1000 may be manufactured as any of various types of storage devices according to a host interface that is a communication scheme with the host 2000. For example, the storage device 1000 may be implemented with any of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 1000 may be implemented as any of various package types. For example, the storage device 1000 may be implemented as any of various package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data or use stored data. The memory device 100 operates under the control of the memory controller 200. Also, the memory device 100 may include a plurality of memory dies, and each of the plurality of memory dies may include a memory cell array including a plurality of memory cells for storing data.

Each of the memory cells may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

The memory cell array may include a plurality of memory blocks. Each memory block may include a plurality of memory cells, and one memory block may include a plurality of pages. The page may be a unit for storing data in the memory device 100 or reading data stored in the memory device 100.

The memory device 100 may be implemented as a Double Data Rate Synchronous Dynamic Random Access Memory (DDR SDRAM), a Low Power Double Data Rate 4 (LPDDR4) SDRAM, a Graphics Double Data Rate (GDDR) SDRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 100 is a NAND flash memory is described.

The memory device 100 may receive a command and an address from the memory controller 200. The memory device 100 may access an area selected by the received address in the memory cell array. The memory device 100 accessing the selected area may mean that the memory device 100 performs an operation corresponding to the received command on the selected area. For example, the memory device 100 may perform a write operation (program operation), a read operation, and an erase operation. The program operation may be an operation in which the memory device 100 records data in the area selected by the address. The read operation may mean an operation in which the memory device 100 reads data from the area selected by the address. The erase operation may mean an operation in which the memory device 100 erases data stored in the area selected by the address.

The memory controller 200 may control overall operations of the storage device 1000.

When power is applied to the storage device 1000, the memory controller 200 may execute firmware (FW). The FW may include a Host Interface Layer (HIL) which receives a request input from the host 2000 or outputs a response to the host 2000, a Flash Translation Layer (FTL) which manages an operation between an interface of the host 2000 and an interface of the memory device 100, and a Flash Interface Layer (FIL) which provides a command to the memory device 100 or receives a response from the memory device 100.

The memory controller 200 may receive data and a Logical Address (LA) from the host 2000, and translate the LA into a Physical Address (PA) representing an address of memory cells included in the memory device 100, in which data is to be stored. The LA may be a Logical Block Address (LBA), and the PA may be a Physical Block Address (PBA).

The memory controller 200 may control the memory device 100 to perform a program operation, a read operation, an erase operation, or the like in response to a request from the host 2000. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

The memory controller 200 may control the memory device 100 to autonomously perform a program operation, a read operation, or an erase operation regardless of any request from the host 2000. For example, the memory controller 200 may control the memory device 100 to perform a program operation, a read operation, or an erase operation, which is used to perform a background operation such as wear leveling, garbage collection, or read reclaim.

The cache memory device 300 may include a first cache memory 310 and a second cache memory 320. The cache memory device 300 may cache data stored in the memory device 100. Specifically, the cache memory device 300 may cache the data stored in the memory device 100 in the first cache memory 310 or the second cache memory 320 under the control of the memory controller 200. The caching may be an operation of temporarily storing or using frequently referred to data in a memory operating at a high speed to reduce the time required to access stored data. The storage device 1000 can reduce a number of times that the memory device 100 is accessed at a low speed, by using the cache memory device 300.

The first cache memory 310 and the second cache memory 320, which are included in the cache memory device 300 may cache data stored in the memory device 100. Specifically, the second cache memory 320 may cache data evicted from the first cache memory 310. That is, the first cache memory 310 may be a cache memory having a level higher than that of the second cache memory 320. The first cache memory 310 may be a memory operating at a speed higher than that of the second cache memory 320. In an embodiment, the first cache memory 310 may operate at a first speed, and the second cache memory 320 may operate at a second speed lower than the first speed.

Also, the first cache memory 310 may have a capacity smaller than that of the second cache memory 320. That is, the first cache memory 310 may be a memory which operates at a speed higher than that of the second cache memory 320 but has a capacity smaller than that of the second cache memory 320. In an embodiment, the first cache memory 310 and the second cache memory 320 may correspond to exclusive caches in which any data shared by the first cache memory 310 and the second cache memory 320 does not exist. In an embodiment, the first cache memory 310 may be a Dynamic Random Access Memory (DRAM), and the second cache memory 320 may be a Persistent Memory (PM).

In an embodiment, since the cache memory device 300 constitutes a multi-tier memory including the first cache memory 310 and the second cache memory 320, hot data among cached data is stored in the first cache memory 310, and cold data among the cached data is stored in the second cache memory 320, so that caching efficiency can be improved. Also, the cache memory device 300 prevents frequent eviction and load, thereby increasing the operation efficiency of the multi-tier memory.

The host 2000 may communicate with the storage device 1000, using at least one of various communication standards or interfaces, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

Figure 2:
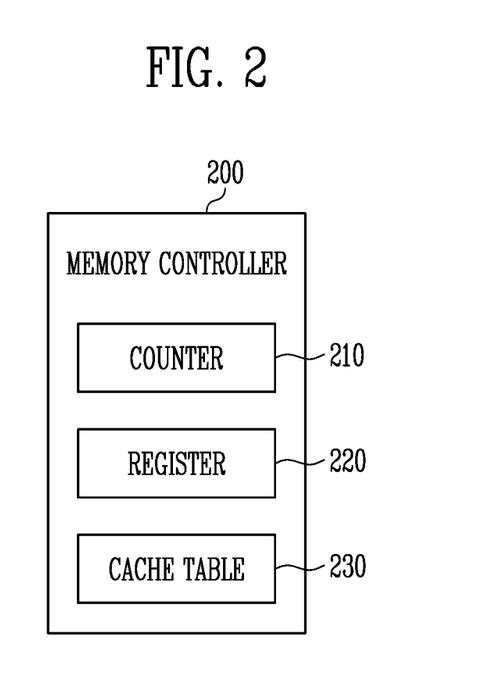
FIG. 2 is a diagram illustrating a configuration of a memory controller in accordance with an embodiment of the present disclosure.

FIG. 2 is a diagram illustrating a configuration of a memory controller in accordance with an embodiment of the present disclosure.

Referring to FIG. 2, the memory controller 200 may include a counter 210, a register 220, and a cache table 230. The counter 210 may count a number of times that a page is read and a number of times that the page is written, based a read request and a write request, which are received from the host 2000. The page may mean memory cells connected to the same word line among memory cells included in a memory block. The page may be one unit for storing data in the memory device 100 or reading data stored in the memory device 100. Specifically, when the counter 210 receives a read request from the host 2000, the counter 210 may count a number of times that a read page is read, based on the read request. Also, when the counter 210 receives a write request from the host 2000, the counter 210 may count a number of times that a page is written, based on the write request. That is, the counter 210 may count a number of times that a read operation or a write operation is performed according to the read request or the write request. A number of times that each page is read and a number of times that each page is written, which are counted by the counter 210, may be stored in the register 220.

When the number of times that the page is read and the number of times that the page is written are counted by the counter 210, the register 220 may store information corresponding to the corresponding read request or the corresponding write request. For example, a number of times data corresponding to the read request or the write request is read and a number of times that the data corresponding to the read request or the write request is written may be accumulated and stored in the register 220. The memory controller 200 may manage data cached in the first cache memory 310 and the second cache memory 320 based on the number of times that the data is read and the number of times that the data is written, the numbers being stored in the register 220. Specifically, the memory controller 200 may move data stored in the first cache memory 310 to the second cache memory 320, based on the number of times that the data is read and the number of times that the data is written, the numbers being stored in the register 220. Also, the memory controller 200 may move data stored in the second cache memory 320 to the first cache memory 310, based on the number of times that the data is read and the number of times that the data is written, the numbers being stored in the register 220. In accordance with an embodiment of the present disclosure, the memory controller 200 may move, to the second cache memory 320, first data satisfying a predetermined condition among data stored in the first cache memory 310. The predetermined condition may mean a condition in which the number of times that the data is read is equal to or greater than a threshold value and the number of times that the data is written is once. Also, in accordance with an embodiment, the memory controller 200 may initialize the number of times that data corresponding to the first cache memory 310 is read and the number of times that the data corresponding to the first cache memory 310 is written in the register 220 according to a constant period. That is, the memory controller 200 may control the cache memory device 300 to store hot data in the first cache memory 310 and store cold data in the second cache memory 320, based on information stored in the register 220.

The cache table 230 may store mapping information on data cached in the cache memory device 300. In an embodiment, the cache table 230 may store mapping information on data cached in the first cache memory 310 and the second cache memory 320. The mapping information may be information on an address (e.g., a logical address and a physical address of the memory device 100) representing a position at which the data cached in the cache memory device 300 is stored. When the memory controller 200 receives a write request or a read request from the host 2000, the memory controller 200 may determine a cache miss or a cache hit with reference to the mapping information stored in the cache table 230. The cache miss may mean that corresponding data is not cached in the cache memory device 300, and the cache hit may mean that corresponding data is cached in the cache memory device 300.

Figure 3:
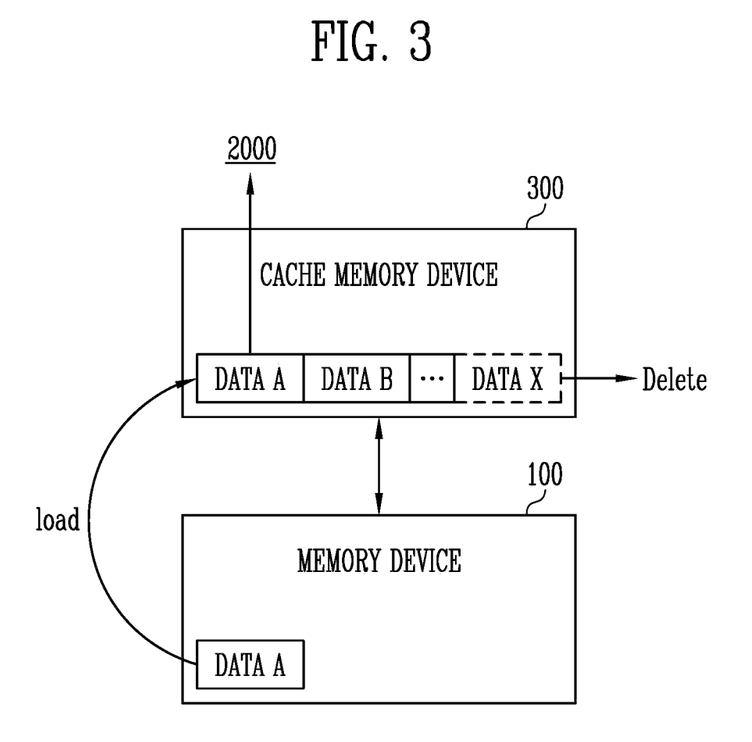
FIG. 3 is a diagram illustrating a caching method of data in accordance with an embodiment of the present disclosure.

FIG. 3 is a diagram illustrating a caching method of data in accordance with an embodiment of the present disclosure.

Referring to FIG. 3, there is illustrated a method in which after data A stored in the memory device 100 is cached in the cache memory device 300, the cached data A is transmitted to the host 2000.

Specifically, the memory device 100 may include a plurality of memory cells, and the plurality of memory cells may store data. For example, the data A may be stored in at least one memory cell among the plurality of memory cells included in the memory device 100.

In addition, the cache memory device 300 may receive a read request for requesting specific data (e.g., the data A) stored in the memory device 100 from the host 2000. The cache memory device 300 may load specific data corresponding to the read request in response to the read request received from the host 2000.

In accordance with an embodiment of the present disclosure, when the storage device 1000 receives a read request for the 'data A' from the host 2000, the storage device 1000 may determine whether the 'data A' has been cached in the cache memory device 300. Also, when a cache miss that the 'data A' does not exist in the cache memory device 300 is determined, the storage device 1000 may load the 'data A' from the memory device 100 to the cache memory device 300. Also, the storage device 1000 may transmit, to the host 2000, the 'data A' loaded to the cache memory device 300.

The storage device 1000 may secure a space to which the 'data A' is to be loaded in the cache memory device 300, before the 'data A' is loaded to the cache memory device 300. When a remaining storage capacity is smaller than a storage capacity required when the 'data A' is loaded in the cache memory device 300, the storage device 1000 may delete, from the cache memory device 300, least recently used 'data X' among data cached in the cache memory device 300. After the storage device 1000 secures the space to which the 'data A' is to be loaded by deleting the 'data X', the storage device 1000 may transmit the 'data A' from the memory device 100.

Figure 4:
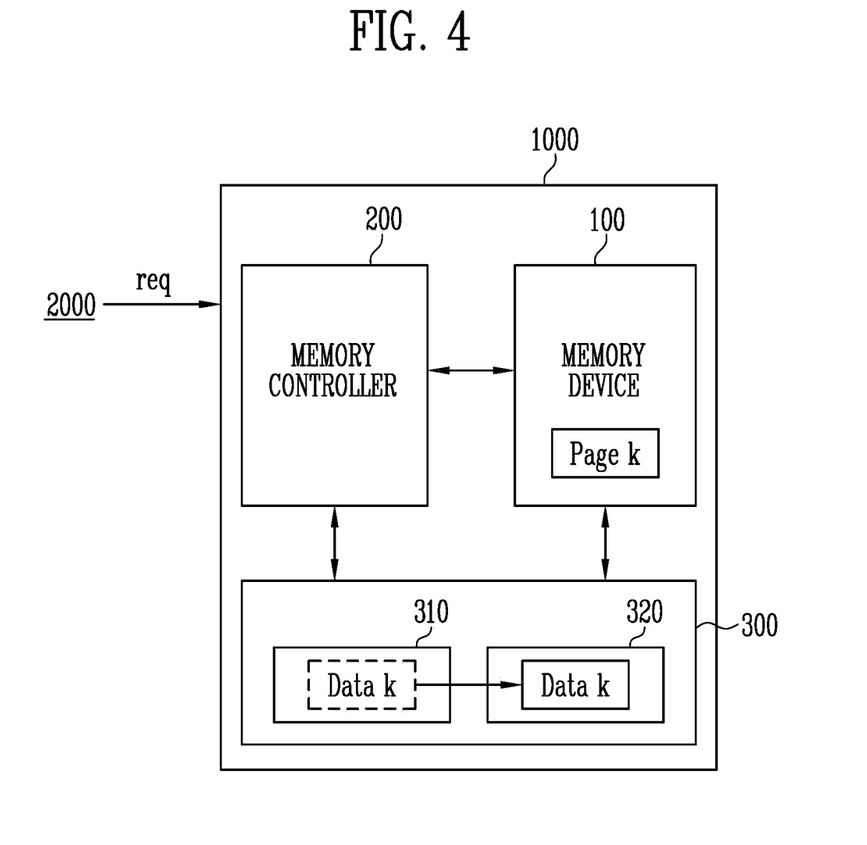
FIG. 4 is a diagram illustrating an operation of the storage device in accordance with an embodiment of the present disclosure.

FIG. 4 is a diagram illustrating an operation of the storage device in accordance with an embodiment of the present disclosure.

Referring to FIG. 4, the storage device 1000 may include a memory device 100, a memory controller 200, and a cache memory device 300.

The memory device 100 may include a plurality of pages. In addition, the cache memory device 300 may include a first cache memory 310 which caches first data among data stored in the plurality of pages and a second cache memory 320 which caches second data among the data stored in the plurality of pages.

The memory controller 200 may count a number of times that each of the plurality of pages is read and a number of times that each of the plurality of pages is written, based on a read request and a write request, which are received from the host 2000. Also, when there exists any page (e.g., a page k) in which a number of times that the any page is read and a number of times that the any page is written satisfy a predetermined condition among the plurality of pages, the memory controller 200 may move first data (e.g., data k) stored in the any page (e.g., the page k) from the first cache memory 310 to the second cache memory 320. The predetermined condition may mean a condition in which the number of times that the any page is read is equal to or greater than a threshold value and the number of times that the any page is written is once. For example, the number of times that the page k is read may be a number of times, which is equal to or greater than the threshold value, and the number of times that the page k is written may be once.

In an embodiment, the memory controller 200 may initialize a number of times that the first data is read and a number of times that the first data is written according to a constant period. The memory controller 200 initializes the number of times that the data cached in the first cache memory 310 is read and the number of times that the data cached in the first cache memory 310 is written according to the constant period, to enable cached data not to be concentrically cached in any one of the first cache memory 310 and the second cache memory 320.

When there occurs data having a number of times that the data is written, which is twice or more, among second data cached in the second cache memory 320 as a write request is received from the host 2000, the storage device 1000 may move the data having the number of times that the data is written, which is twice or more, from the second cache memory 320 to the first cache memory 310, and initialize a number of times that the moved data is read and a number of times that the moved data is written.

Figure 5:
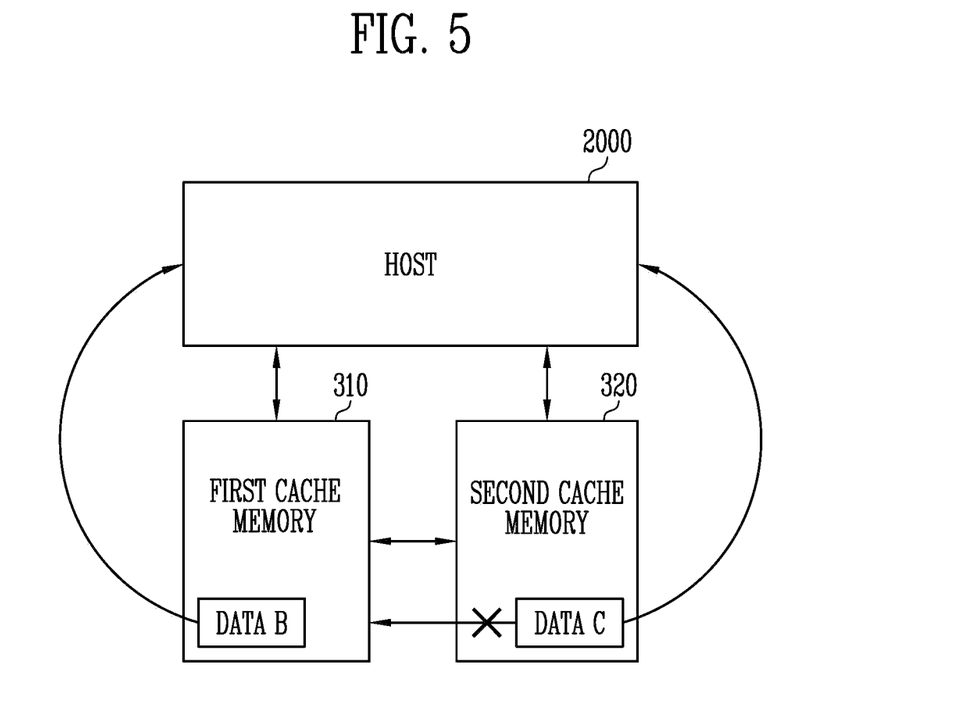
FIG. 5 is a diagram illustrating an operation of a cache memory in a read operation in accordance with an embodiment of the present disclosure

FIG. 5 is a diagram illustrating an operation of a cache memory in a read operation in accordance with an embodiment of the present disclosure.

Referring to FIG. 5, FIG. 5 is a diagram illustrating a case where the storage device 1000 receives a read request for 'data B' or 'data C' from the host 2000. When the storage device 1000 receives a read request for 'data B' or 'data C' from the host 2000, the storage device 1000 may determine whether the 'data B' or the 'data C' has been cached in the first cache memory 310 or the second cache memory 320. Since the first cache memory 310 is a cache memory having a level higher than that of the second cache memory 320, the storage device 1000 may determine whether the 'data B' or the 'data C' has been cached in the first cache memory 310 and then determine whether the 'data B' or the 'data C' has been cached in the second cache memory 320.

Since the 'data B' is cached in the first cache memory 310, the 'data B' may be cache-hit in the first cache memory 310. In addition, the storage device 1000 may transmit the 'data B' in the first cache memory 310 to the host 2000.

When a cache miss that the 'data C' does not exist in the first cache memory 310 is determined, the storage device 1000 may determine whether the 'data C' has been cached in the second cache memory 320. Since the 'data C' is cached in the second cache memory 320, the 'data C' may be cache-hit in the second cache memory 320. In an embodiment, the storage device 1000 may transmit the 'data C' from the second cache memory 320 to the host 2000 in response to a read request corresponding to the 'data C', which is received from the host 2000. That is, the storage device 1000 does not transmit the 'data C' from the second cache memory 320 to the first cache memory 310 as a cache memory having a level higher than that of the second cache memory 320, but may directly transmit the 'data C' from the second cache memory 320 to the host 2000.

Figure 6:
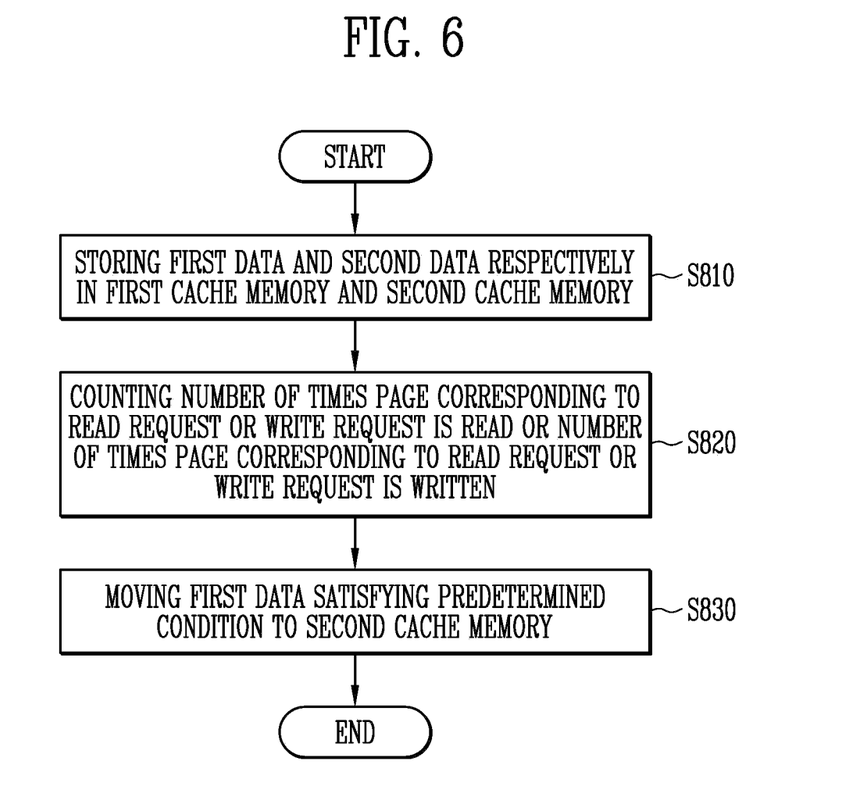
FIG. 6 is a diagram illustrating an operating method of the storage device in accordance with an embodiment of the present disclosure.

FIG. 6 is a diagram illustrating an operating method of the storage device in accordance with an embodiment of the present disclosure.

Referring to FIG. 6, the storage device 1000 may store first data and second data respectively in the first cache memory 310 and the second cache memory 320 (S810). Specifically, when the storage device 1000 receives a read request or a write request from the host 2000, the storage device 1000 may store data corresponding to the read request or the write request in the first cache memory 310 or the second cache memory 320.

Also, the storage device 1000 may count a number of times that a page corresponding to the read request or the write request, which is received from the host 2000, is read and a number of times that the page corresponding to the read request or the write request is written (S820). In an embodiment, a number of times that each of a plurality of pages is read or a number of times that each of the plurality of pages is written may be accumulated and stored in the register 220.

Also, the storage device 1000 may move, to the second cache memory 320, the first data stored in the first cache memory 310, which satisfies a predetermined condition, based on the number of times that each of the plurality of pages is read and the number of times that each of the plurality of pages is written, the numbers being stored in the register 220 (S830). Specifically, the storage device 1000 may determine whether a number of times that any page among pages corresponding to the first data is read and a number of times that the page among the pages corresponding to the first data is written satisfy a predetermined condition. The predetermined condition may mean that the number of times that the page is read is equal to or greater than a threshold value and a number of times that a specific page is written is once. Also, the storage device 1000 may move, to the second cache memory 320, the first data stored in the first cache memory 310, which satisfies the predetermined condition.

In an embodiment, the storage device 1000 may initialize a number of times that the pages corresponding to the first data are read and a number of times that the pages corresponding to the first data are written according to a constant period.

In an embodiment, when the storage device 1000 receives, from the host 2000, third data to replace the second data stored in the second cache memory 320 and a write request for the third data, the storage device 1000 may evict the second data from the second cache memory 320. Also, the storage device 1000 may store the third data in the first cache memory 310. The third data may be the same data as the second data or may be an updated version of the second data.

Figure 7:
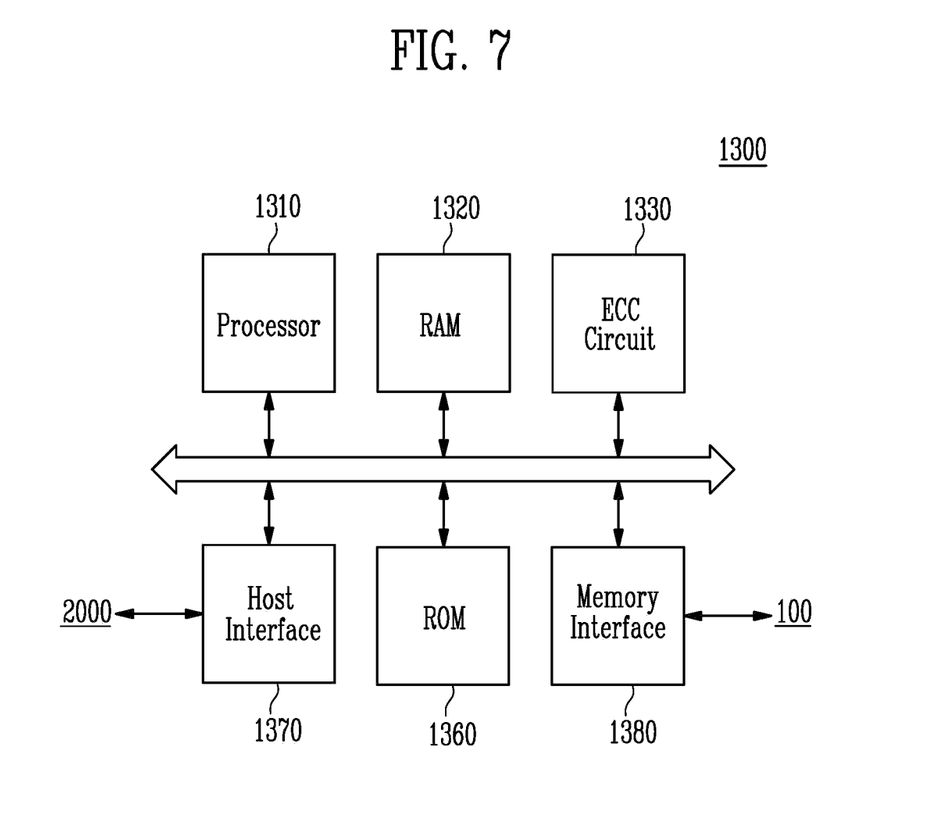
FIG. 7 is a diagram illustrating a memory controller in accordance with another embodiment of the present disclosure.

FIG. 7 is a diagram illustrating a memory controller in accordance with another embodiment of the present disclosure.

Referring to FIG. 7, the memory controller 1300 may include a processor 1310, a RAM 1320, an Error Correction Code (ECC) circuit 1330, a ROM 1360, a host interface 1370, and a memory interface 1380. The memory controller 1300 shown in FIG. 7 may be an embodiment of the memory controller 200 shown in FIG. 1.

The processor 1310 may communicate with the host 2000 by using the host interface 1370, and perform a logical operation to control an operation of the memory controller 1300. For example, the processor 1310 may load a program command, a data file, a data structure, etc., based on a request received from the host 2000 or an external device, and perform various operations or generate a command and an address. For example, the processor 1310 may generate various commands necessary for a program operation, a read operation, an erase operation, a suspend operation, and a parameter setting operation.

Also, the processor 1310 may perform a function of a Flash Translation Layer (FTL). The processor 1310 may translate a Logical Block Address (LBA) provided by the host 2000 into a Physical Block Address (PBA) through the FTL. The FTL may receive an LBA input by using a mapping table, to translate the LBA into a PBA. Several address mapping methods of the FTL exist according to mapping units. A representative address mapping method includes a page mapping method, a block mapping method, and a hybrid mapping method.

Also, the processor 1310 may generate a command without any request from the host 2000. For example, the processor 1310 may generate a command for background operations such as operations for wear leveling of the memory device 100 and operations for garbage collection of the memory device 100.

The RAM 1320 may be used as a buffer memory, a working memory, or a cache memory of the processor 1310. Also, the RAM 1320 may store codes and commands, which the processor 1310 executes. The RAM 1320 may store data processed by the processor 1310. Also, the RAM 1320 may include a Static RAM (SRAM) or a Dynamic RAM (DRAM).

The ECC circuit 1330 may detect an error in a program operation or a read operation, and correct the detected error. Specifically, the ECC circuit 1330 may perform an error correction operation according to an Error Correction Code (ECC). Also, the ECC circuit 1330 may perform ECC encoding, based on data to be written to the memory device 100. The data on which the ECC encoding is performed may be transferred to the memory device 100 through the memory interface 1380. Also, the ECC circuit 1330 may perform ECC decoding on data received from the memory device 100 through the memory interface 1380.

The ROM 1360 may be used as a storage unit for storing various information necessary for an operation of the memory controller 1300. Specifically, the ROM 1360 may include a map table, and physical-to-logical address information and logical-to-physical address information may be stored in the map table. Also, the ROM 1360 may be controlled by the processor 1310.

The host interface 1370 may include a protocol for exchanging data between the host 2000 and the memory controller 1300. Specifically, the host interface 1370 may communicate with the host 2000 through at least one of various communication interfaces or protocols such as a Universal Serial Bus (USB) protocol, a Multi-Media Card (MMC) protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer System Interface (SCSI) protocol, an Enhanced Small Disk Interface (ESDI) protocol, an Integrated Drive Electronics (IDE) protocol, and a private protocol.

The memory interface 1380 may communicate with the memory device 100 by using a communication protocol under the control of the processor 1310. Specifically, the memory interface 1380 may communicate a command, an address, and data with the memory device 100 through a channel. For example, the memory interface 1380 may include a NAND interface.

Figure 8:
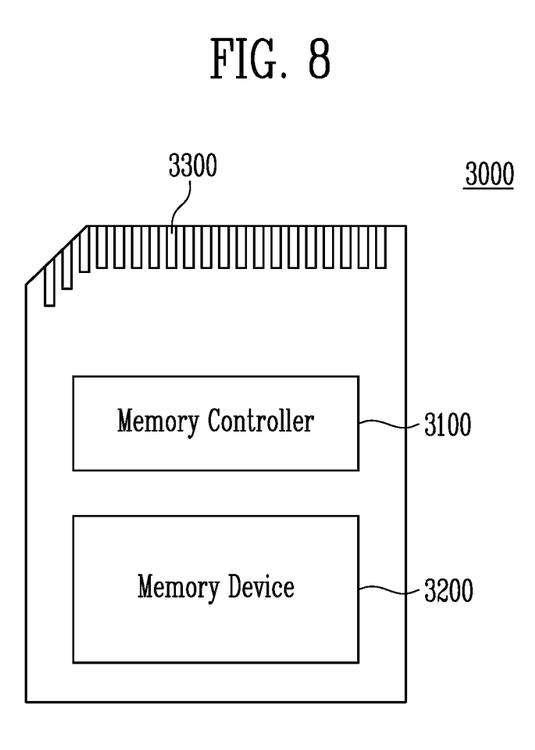
FIG. 8 is a diagram illustrating a memory card system in accordance with an embodiment of the present disclosure.

FIG. 8 is a diagram illustrating a memory card system in accordance with an embodiment of the present disclosure.

Referring to FIG. 8, the memory card system 3000 includes a memory controller 3100, a memory device 3200, and a connector 3300.

The memory controller 3100 may be connected to the memory device 3200. The memory controller 3100 may access the memory device 3200. For example, the memory controller 3100 may control read, write, erase, and background operations on the memory device 3200. The memory controller 3100 may provide an interface between the memory device 3200 and a host. Also, the memory controller 3100 may drive firmware for controlling the memory device 3200.

For example, the memory controller 3100 may include components such as a Random Access Memory (RAM), a processing unit, a host interface, a memory interface, and the error corrector.

The memory controller 3100 may communicate with an external device through the connector 3300. The memory controller 3100 may communicate with the external device (e.g., the host) according to a specific communication protocol. The memory controller 3100 may communicate with the external device through at least one of various communication standards or interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

The memory device 3200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 3100 and the memory device 3200 may be integrated into a single semiconductor device, to constitute a memory card. For example, the memory controller 3100 and the memory device 3200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 9:
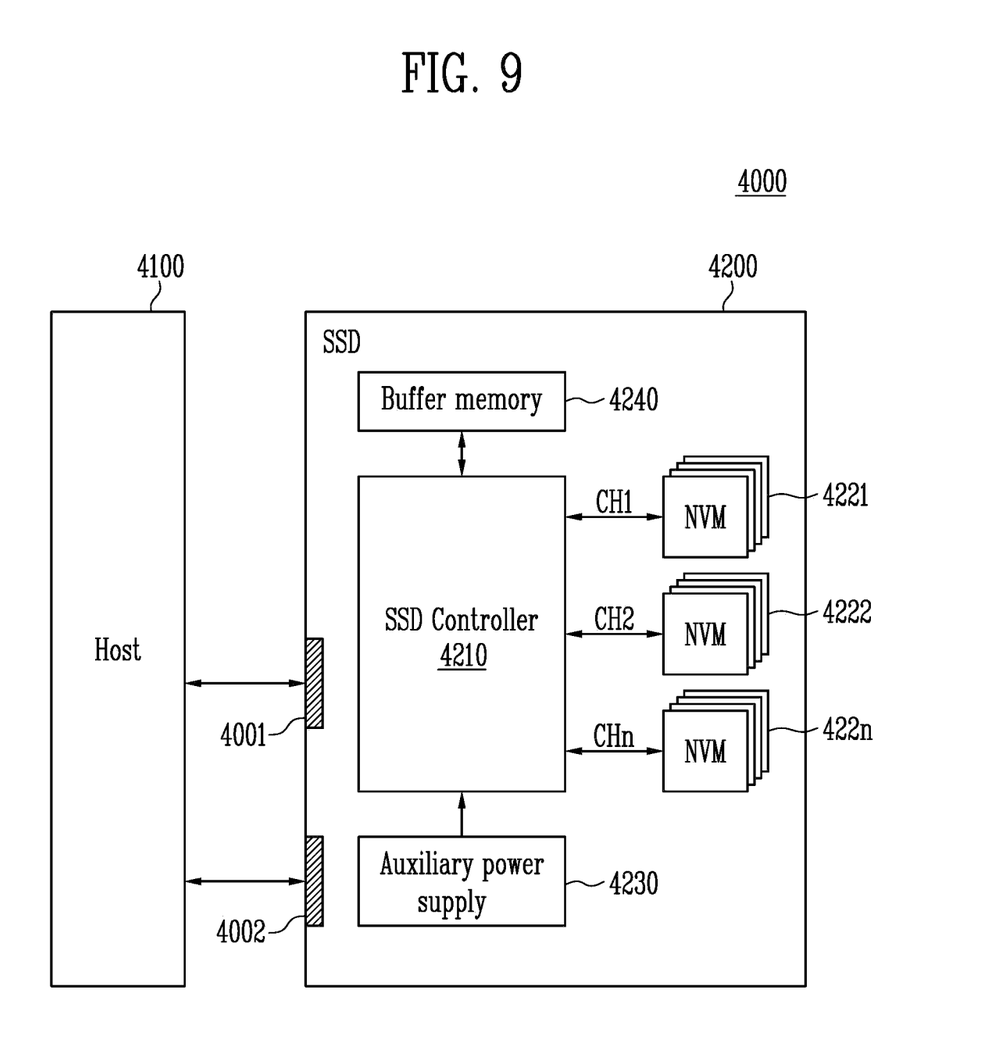
FIG. 9 is a diagram illustrating a Solid State Drive (SSD) system in accordance with an embodiment of the present disclosure.

FIG. 9 is a diagram illustrating a Solid State Drive (SSD) system in accordance with an embodiment of the present disclosure.

Referring to FIG. 9, the SSD system 4000 includes a host 4100 and an SSD 4200. The SSD 4200 exchanges a signal SIG with the host 4100 through a signal connector 4001, and receives power PWR through a power connector 4002. The SSD 4200 includes an SSD controller 4210, a plurality of flash memories or Non-Volatile Memories (NVMs) 4221 to 422n, an auxiliary power supply 4230, and a buffer memory 4240.

In an embodiment, the SSD controller 4210 may serve as the memory controller 200 described with reference to FIG. 1. The SSD controller 4210 may control the plurality of flash memories or Non-Volatile Memories (NVMs) 4221 to 422n in response to a signal SIG received from the host 4100. The signal SIG may be a signal based on an interface between the host 4100 and the SSD 4200. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 4230 may be connected to the host 4100 through the power connector 4002. The auxiliary power supply 4230 may receive power PWR input from the host 4100 and charge the power PWR. When the supply of power from the host 4100 is not smooth, the auxiliary power supply 4230 may provide power to the SSD 4200. The auxiliary power supply 4230 may be located in the SSD 4200, or be located at the outside of the SSD 4200. For example, the auxiliary power supply 4230 may be located on a main board, and provide auxiliary power to the SSD 4200.

The buffer memory 4240 may operate as a buffer memory of the SSD 4200. For example, the buffer memory 4240 may temporarily store data received from the host 4100 or data received from the plurality of flash memories or Non-Volatile Memories (NVMs) 4221 to 422n, or temporarily store meta data (e.g., a mapping table) of the flash memories or Non-Volatile Memories (NVMs) 4221 to 422n. The buffer memory 4240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 10:
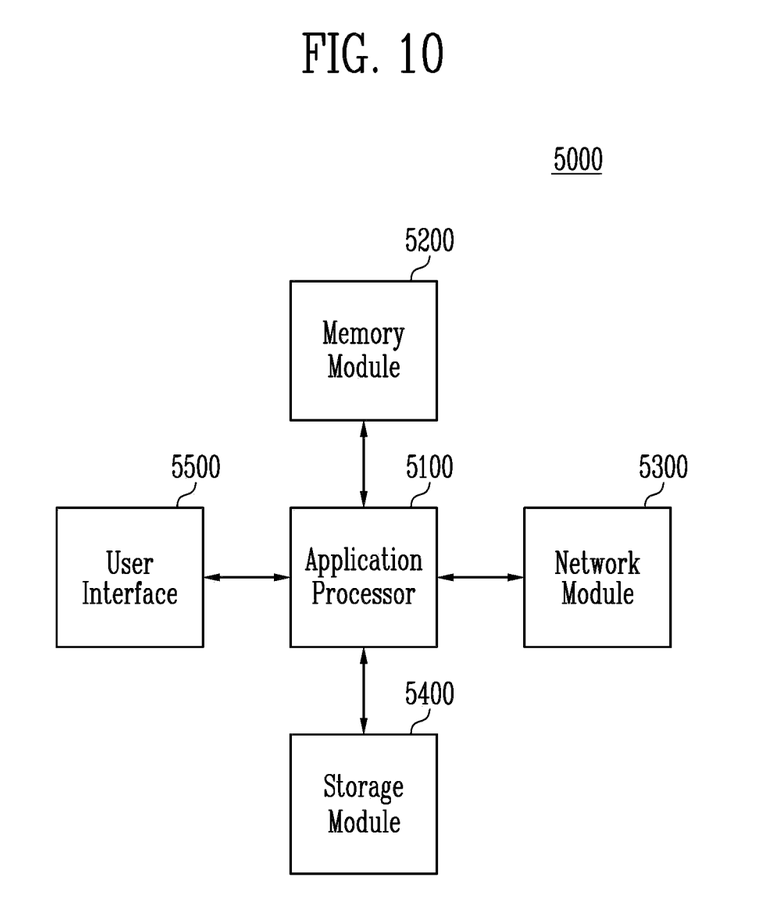
FIG. 10 is a diagram illustrating a user system in accordance with an embodiment of the present disclosure.

FIG. 10 is a diagram illustrating a user system in accordance with an embodiment of the present disclosure.

Referring to FIG. 10, the user system 5000 includes an application processor 5100, a memory module 5200, a network module 5300, a storage module 5400, and a user interface 5500.

The application processor 5100 may drive components included in the user system 5000, an operating system (OS), a user program, or the like. The application processor 5100 may include controllers for controlling components included in the user system 5000, interfaces, a graphic engine, and the like. The application processor 5100 may be provided as a System-on-Chip (SoC).

The memory module 5200 may operate as a main memory, working memory, buffer memory or cache memory of the user system 5000. The memory module 5200 may include volatile random access memories such as a DRAM, an SDRAM, a DDR SDRAM, a DDR2 SDRAM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. The application processor 5100 and the memory module 5200 may be provided as one semiconductor package by being packaged based on a Package on Package (PoP).

The network module 5300 may communicate with external devices. The network module 5300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), WiMAX, WLAN, UWB, Bluetooth, and Wi-Fi. The network module 5300 may be included in the application processor 5100.

The storage module 5400 may store data. For example, the storage module 5400 may store data received from the application processor 5100. Alternatively, the storage module 5400 may transmit data stored therein to the application processor 5100. The storage module 5400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. The storage module 5400 may be provided as a removable drive such as a memory card of the user system 5000 or an external drive.

The storage module 5400 may include a plurality of nonvolatile memory devices, and the plurality of nonvolatile memory devices may operate identically to the memory device 100 described with reference to FIG. 1. The storage module 4400 may operate identically to the storage device 1000 described with reference to FIG. 1.

The user interface 5500 may include interfaces for inputting data or commands to the application processor 5100 or outputting data to an external device. The user interface 5500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 5500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there may be provided a storage device for managing an improved multi-tier cache memory and an operating method of the storage device.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

The embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A storage device comprising:
a memory device including a plurality of pages;
a cache memory device including a first cache memory which caches first data among data stored in the plurality of pages and a second cache memory which caches second data among the data stored in the plurality of pages; and
a memory controller configured to:
count a number of times that each of the plurality of pages is read and a number of times that each of the plurality of pages is written, based on a read request or a write request, which are received from a host, and
move the first data from the first cache memory to the second cache memory when a number of times that a first page which stores the first data is read and a number of times that the first page is written satisfy a predetermined condition,
wherein the predetermined condition is the number of times that the first page is read is equal to or greater than a threshold value and the number of times that the first page is written is one.

2. The storage device of claim 1, wherein the memory controller includes:
a counter configured to count the number of times that each of the plurality of pages is read and the number of times that each of the plurality of pages is written, based on the read request and the write request, which are received from the host; and
a register configured to store the number of times that each of the plurality of pages is read and the number of times that each of the plurality of pages is written.

3. The storage device of claim 2, wherein the memory controller is further configured to move the first data back from the second cache memory to the first cache memory when the number of times that the first page is written is two or greater.

4. The storage device of claim 1, wherein, when a write request is provided for third data to replace the second data, the memory controller is further configured to evict the second data from the second cache memory and cache the third data in the first cache memory.

5. The storage device of claim 1, wherein the memory controller is further configured to control, when receiving from the host a read request for the second data, the second cache memory to transmit the second data from the second cache memory to the host.

6. The storage device of claim 1, wherein the first cache memory and the second cache memory correspond to exclusive caches in which any data shared by the first cache memory and the second cache memory does not exist.

7. The storage device of claim 1, wherein the first cache memory operates at a first speed and the second cache memory operates at a second speed slower than the first speed.

8. The storage device of claim 1, wherein the first cache memory is a Dynamic Random Access Memory (DRAM) and the second cache memory is a Persistent Memory (PM).

9. A method for operating a storage device including a first cache memory and a second cache memory, the method comprising:
storing, in the first cache memory, first data among data stored in a plurality of pages included in a memory device and storing, in the second cache memory, second data among the data stored in the plurality of pages included in the memory device;
counting a number of times that a page corresponding to a read request or a write request is read or a number of times that the page is written, when the read request or the write request is received from a host; and
moving the first data from the first cache memory to the second cache memory when a number of times that a first page which stores the first data is read and a number of times that the first page is written satisfy a predetermined condition,
wherein the predetermined condition is the number of times that the first page is read is equal to or greater than a threshold value and the number of times that the first page is written is one.

10. The method of claim 9, further comprising storing a number of times that each of the plurality of pages is read and a number of times that each of the plurality of pages is written.

11. The method of claim 9, further comprising when a write request is provided for third data to replace the second data:
- evicting the second data from the second cache memory, and
- storing the third data in the first cache memory.

12. The method of claim 9, further comprising transmitting the second data from the second cache memory to the host when a read request for the second data is received from the host.

13. The method of claim 9, wherein the first cache memory and the second cache memory correspond to an exclusive cache in which any data shared by the first cache memory and the second cache memory does not exist.

14. The method of claim 9, wherein the first cache memory operates at a first speed and the second cache memory operates at a second speed slower than the first speed.

15. An operating method of a controller, the method comprising:
- caching, into a first cache, page data stored or to be stored in pages within a memory device in response to a first request for accessing the page data;
- moving at least a part of the cached data into a second cache when a number of times that the part is read is equal to or greater than a threshold value and a number of times that the part is written is one; and
- providing the cached data from one of the first and second caches in response to a second request for accessing the page data.

* * * * *